Figure 1:
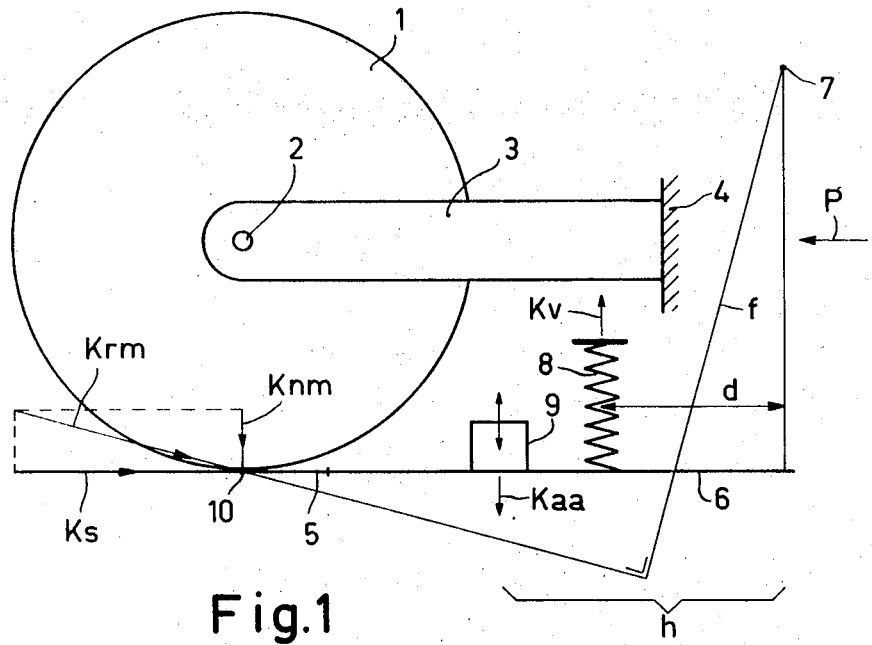

United States Patent
Beusink et al.

[11] 3,863,429
[45] Feb. 4, 1975

[54] CYLINDER LAWN MOWER

[75] Inventors: Bernard Joseph Beusink, Oerle; Barteld Niezen, Goningen, both of Netherlands

[73] Assignee: U.S. Philips Corporation, New York, N.Y.

[22] Filed: Apr. 14, 1971

[21] Appl. No.: 133,813

[30] Foreign Application Priority Data
Apr. 17, 1970 Netherlands................. 7005530

[52] U.S. Cl. ............................................. 56/249
[51] Int. Cl. ............................................. A01d 55/20
[58] Field of Search................. 56/249, 10.2, 17.4

[56] References Cited
UNITED STATES PATENTS
2,651,904   9/1953   Jatunn ................................. 56/249
2,896,390   7/1959   Cunningham ......................... 56/249
2,929,190   3/1960   Woody ................................. 56/249

Primary Examiner—Louis G. Mancene
Assistant Examiner—J. N. Eskovitz
Attorney, Agent, or Firm—Frank R. Trifari

[57] ABSTRACT

A lawn mower of the cutter cylinder type having a wheeled frame carrying a cylinder with cutting knives. The cutter cylinder and a ledger blade mounted on the frame are resiliently maintained in engagement with one another up to an abutment by spring means. A component of the cutting force which manifests itself during the cutting operation produces a force in a direction opposite to the direction of said spring force so that upon an excessive cutting force the cutter cylinder and ledger blade will separate. Lawn mower of the cutter cylinder provided with a protection against an excess of cutting force manifesting itself.

9 Claims, 6 Drawing Figures

CYLINDER LAWN MOWER

The invention relates to a cutter-cylinder lawn mower having a co-operating knife-and-blade system which is arranged in a wheeled frame. The mower has a rotatably drivable cylinder carrying at least one cylinder knife, and a ledger blade mounted in a blade support. The cutter-cylinder knives and the ledger blade support are resiliently held towards each other up to an adjustable abutment under the action of a spring preferably a helical spring which is secured to the frame and resiliently supports each knife of the cutter cylinder and the ledger blade support. The abutment secured to the frame enables a minimum cutting gap to be set between the cutter cylinder and the ledger blade.

Such an arrangement is described inter alia in British Patent Specification No. 458,273, in which the resiliently arranged ledger blade is maintained spaced from the cutter cylinder by cutting gap distance when the mower is not in use.

In such cutter-cylinder lawn mowers attempts have been made to solve the problem of limiting the consequences of the occurrence of an excess of cutting force manifesting itself, for example, by manufacturing the ledger blade from a flexible material.

Such a solution is not satisfactory in practice, because either permanent deformations of the ledger blade are produced or the cylinder knives are damaged, also, jamming of the mower in operation in a situation in which an excess of cutting force manifests itself cannot always be prevented.

It is an object of the invention to provide a cutter-cylinder lawn mower in which the above disadvantages are avoided when an excess of cutting force manifests itself. This is accomplished by providing each resiliently supported knife or blade of the cutter system to be pivotable into engagement with the abutment about a pivot which extends parallel to the cylinder spindle and is journalled in the frame so that the cutting force which manifests itself during the cutting operation produces a moment acting about the pivot with respect to each pivotable knife or blade. The sense of this moment is opposite to that of the moment which the spring produces about this pivot with respect to each pivotable knife or blade, when an excess of cutting force manifests itself, in which case the moment produced by the cutting force exceeds the moment effectuated by the spring. The moment produced by the cutting force results in the cylinder knives and the ledger-blade support being moved apart.

An embodiment in which the cylinder spindle is mounted in a sub-frame connected to the frame and in which the ledger blade is resiliently supported is characterized in that the ledger blade support is arranged so as to be pivotable about the pivot which is mounted in the frame and the axis of which, in a cross-sectional view taken at right angles to the direction of length of the cylinder spindle, viewed in the travelling direction of the mower is situated behind the cylinder spindle and furthermore in the space bounded by the lines passing through the point of contact of the ledger blade with the cylinder and through the cylinder spindle and by the line tangent to the cylinder through this point of contact, preferably so that the distances from this axis to the aforementioned lines are substantially equal.

This embodiment relates to a cutter-cylinder lawn mower having a protectedly arranged ledger blade, in which the ledger blade pivots away from the cylinder when an excessive cutting force manifests itself.

If for example in such a cutter-cylinder lawn mower pebbles get between the knife or knives and the blade and an excessive cutting force is produced, the ledger blade swings away from the cylinder, thereby allowing the pebbles to pass between it and the knife or knives, after which the spring of the resiliently supported ledger blade ensures that the initial relative positions of the knife or knives and the blade are restored.

A preferred modification of the latter embodiment relates to a cutter-cylinder lawn mower having a resiliently supported ledge blade which is arranged both self-energizingly and protectedly. This embodiment is characterized in that the lateral face of the ledger-blade support nearer the cylinder has a groove formed in it in which the ledger blade is pivotably arranged and is stopped in its movement towards the cylinder by an abutment, whilst at the side of the line-tangent to the cylinder more remote from the cylinder the line connecting the contact point and the pivot axis passes through the point of contact, whereas from this point of contact in a direction opposite to the travelling direction this connecting line intersects the said tangent at an acute angle.

A cutter-cylinder lawn mower having a self-energizingly arranged ledger blade is described inter alia in British Patent Specification No. 523,951. the essential feature of this self-energizing arrangement is that when the cutting force which manifests itself increases an increased contact pressure between the cylinder and the ledger blade is produced.

From the above it will be clear that the solution according to the invention is of the utmost importance for such lawn mowers, because especially in these mowers an excessive cutting force will manifest itself and this hitherto has frequently given rise to the mower being jammed in operation, especially when hard objects found their way between the co-operating knife or knives and blade.

Another preferred embodiment of a cutter-cylinder lawn mower having a resiliently supported ledger blade relates to a lawn mower having a self-energizing arranged cutter cylinder and a protectedly arranged ledger blade and is characterized in that the subframe supporting the cylinder spindle is pivotable in a groove formed in the frame and is stopped in its movement towards the ledger blade by an abutment. In a cross-sectional view taken at right angles to the direction of length of the cylinder spindle the axis of the pivot between the frame and the subframe, viewed in the travelling direction, is situated in front of the cylinder spindle at a level such that the line connecting the pivot and the contact point intersects the line tangent to the cylinder at this contact point at an acute angle. The space in the groove is preferably filled with a resilient material through which the subframe is guided. When a cutting force is produced, first the cutter cylinder pivots towards the ledger blade, which pivoting movement is limited by the abutment, while with further increase in the cutting force the protection of the protectedly arranged ledger blade becomes operative, so that the ledger blade pivots away from the cutter cylinder.

A further embodiment relates to a cutter-cylinder lawn mower having a protectedly arranged cylinder and is characterized in that the cylinder spindle is supported in a subframe which is arranged so as to be pivotable about the pivot supported in the frame up to the adjustable abutment. The axis of the pivot in a cross-sectional view taken at right angles to the direction of length of the cylinder spindle, when viewed in the travelling direction of the mower, is situtated behind the cylinder spindle and in the space which is bounded by the lines which pass through the point of contact between the cutter cylinder and the ledger blade and through the cylinder spindle and by the line tangent to the cylinder at the said point of contact, preferably so that the distances from this axis to the aforementioned lines are substantially equal.

When an excessive cutting force manifests itself, the cylinder is pivoted away from the ledger blade in this embodiment.

A preferred version of the said further embodiment relates to a resiliently supported cutter cylinder which is arranged both self-energizingly and protectedly, and is characterized in that in the travelling direction, the subframe extends beyond the cylinder, whilst in this part of the subframe extending beyond the cylinder there is supported a second pivot about which a holder for the cylinder spindle is pivotable, and is stopped in its movement towards the ledger blade by an abutment. the space in this groove is preferably filled with a resilient material through which the holder is guided.

When a cutting force is produced, first the cylinder spindle is pivoted towards the ledger blade until this pivoting movement is stopped by the abutment, after which the protection of the likewise protectedly arranged cylinder may become operative, so that the cylinder is pivoted away from the ledger blade.

Another preferred embodiment of a cutter-cylinder lawn mower having a resiliently supported cutter cylinder relates to a protectedly arranged cylinder and a self-energizingly arranged ledger blade and is characterized in tha the lateral face of the ledger blade support nearer the cutter cylinder has a groove formed in it in which the ledger blade is pivotably mounted and is stopped in its movement towards the cylinder by an abutment, whilst the line connecting the contact point and the pivot is situated on that side of the line tangent to the cylinder through the contact point which is more remote from the cylinder, and this connecting line when produced from the contact point in a direction opposite to the travelling direction intersects the said tangent at an acute angle, the groove preferably being filled with a resilient material in which the ledger blade is embedded.

When in this preferred embodiment a cutting force is produced, the ledger blade pivots towards the cutter cylinder, whereas with further increase in the cutting force the cylinder pivots away from the ledger blade, since the protection of the protectedly arranged cylinder will then become operative.

Figure 2:
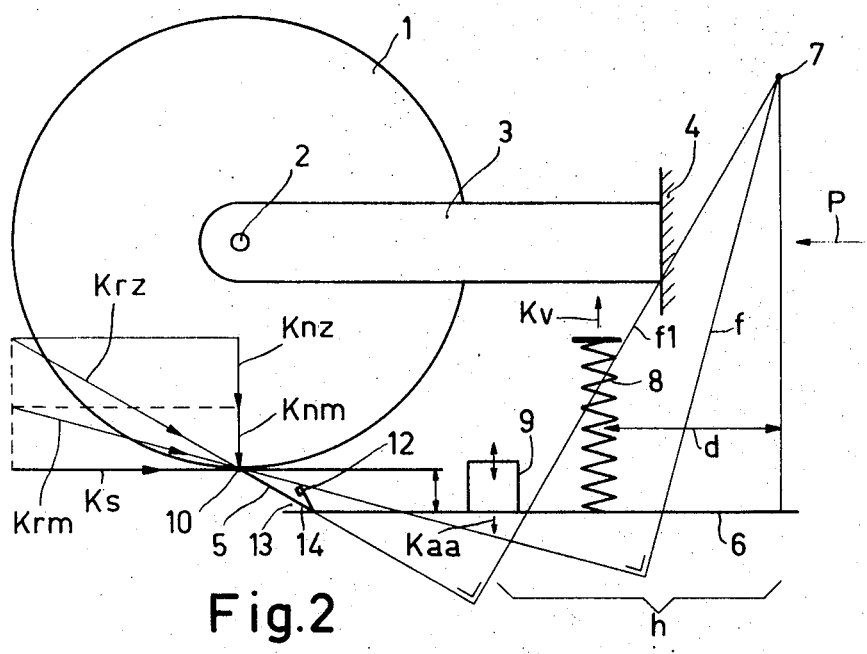
Figure 3:
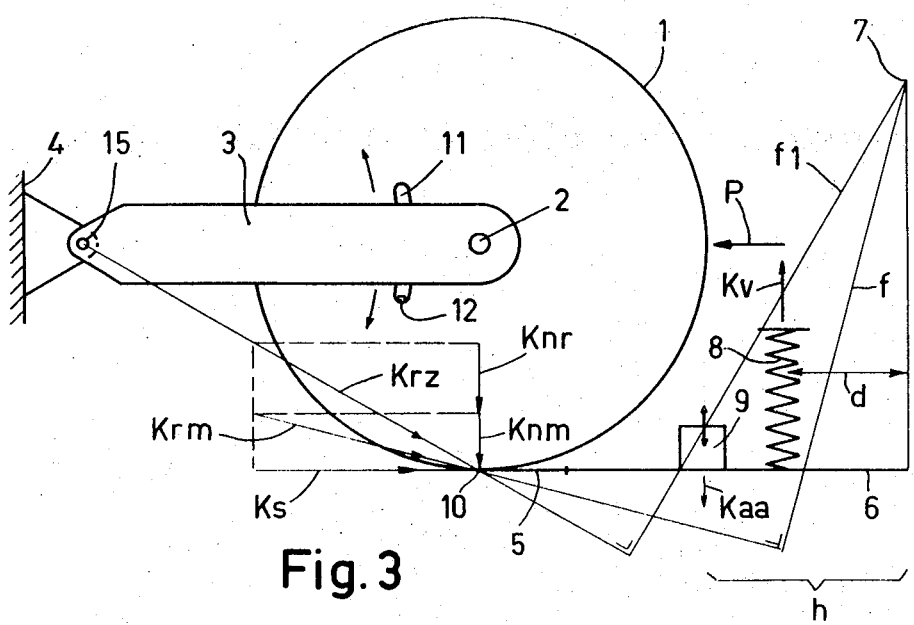
Figure 4:
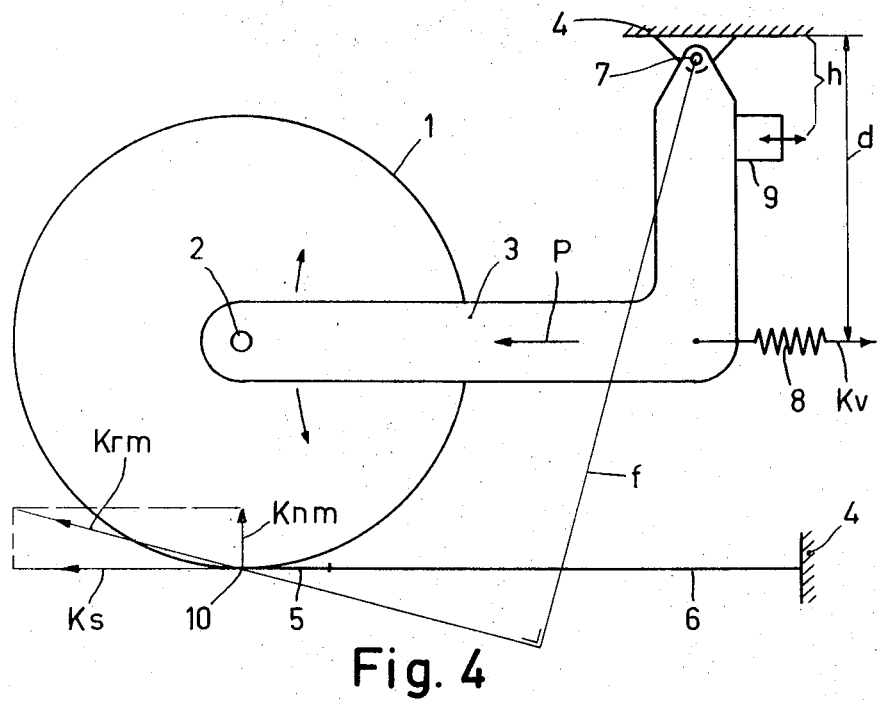
Figure 5:
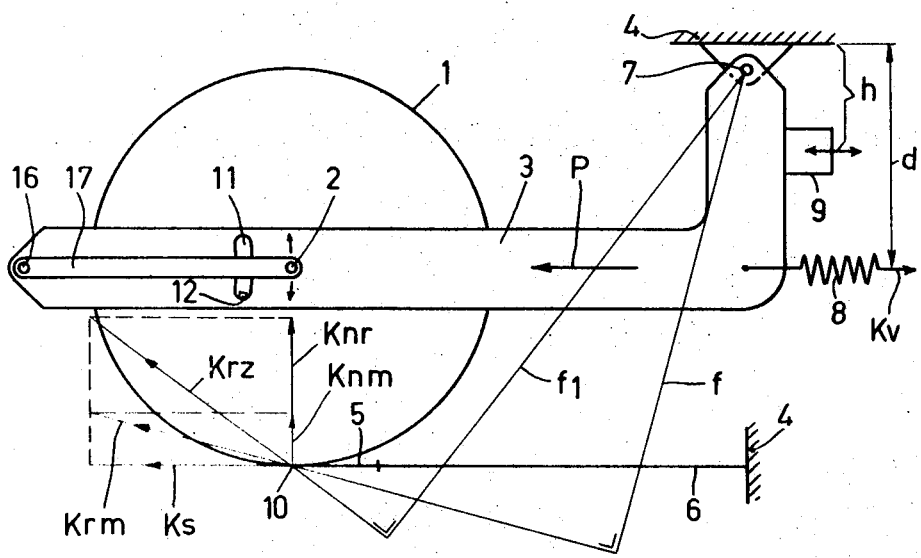

The invention will be described more fully with reference to a description of the accompanying diagrammatic drawings of embodiments and preferred modifications thereof, in which irrelevant component parts have been omitted, while further advantageous particulars will become apparent, in which drawings like component parts are indicated by similar reference numerals, and in which drawings FIG. 1 is a cross-sectional view of a cutter-cylinder lawn mower fitted with a protectedly arranged ledger blade, FIG. 2 shows a modification of the mower shown in FIG. 1, FIG. 3 likewise shows a modification of the mower of FIG. 1, FIG. 4 shows a cutter-cylinder lawn mower fitted with a protectedly arranged cutter cylinder, FIG. 5 shows a modification of the lawn mower of FIG. 4, and FIG. 6 likewise shows a modification of the mower of FIG. 4.

Referring now to FIG. 1, there is shown a cooperating knife and blade system for a cutter cylinder lawn mower which comprises a cutter cylinder 1 which is rotatable about a cylinder spindle 2 supported in a subframe 3 which is connected to a wheeled frame 4 accommodating the cooperating knife and blade system. A ledger blade 5 is supported by a ledger blade support 6 which is pivotable about a pivot 7 supported in the frame 4. The ledger blade support is resiliently supported by a spring 8 secured to the frame 4. The spring 8, which tends to move the blade support 6 towards the cutter cylinder 1, is so impeded in its action by an adjustable abutment 9, such as movable stop plate on the frame, a bolt, adjustment screw or any other similar structural means which may be used as such an abutment, secured to the frame 4 that a cutting gap is produced between the ledger blade 5 and the cutter cylinder 1. If the force which the abutment 9 exerts on the blade support 6 is referred to as $Kaa$ and the force which the spring 8 exerts on this blade support is referred to as $Kv$, then during the inoperative condition of the lawn mower in the balanced position of the ledger blade 6 the sum of the moments about the pivot point 7 is equal to zero, which means that $Kv \cdot d = Kaa \cdot h$, where $d$ is the perpendicular distance of the pivot point 7 from the line of action of the force $Kv$, and $h$ is the perpendicular distance of the pivot point 7 from the line of action of the force $Kaa$. The dimension $h$ also defines the perpendicular distance of the abutment from the line passing through pivot point 7 parallel to the force $Kaa$. In a cutter-cylinder lawn mower having a drivable cutting cylinder the knives of which move from the front to the back towards the ledger blade, cutting the material to be cut requires the exertion of a cutting force $Ks$ in a direction opposite to the travelling direction, which force a priori is of unknown magnitude.

The design of the cutter cylinder lawn mower must be based on the fact that the lawn mower must be capable of supplying the maximum $Ks$ to be expected i.e. the driving engine must have sufficient power and the transmission members must have sufficient rigidity.

The resistance of the material to be cut against this $Ks$, which is the only one of the forces to be referred to which does work, produces a normal force $Knm$ acting on the cooperatin knives and blade but of which only the normal force acting on the ledger blade need be considered. The cutting force $Ks$ and the normal force $Knm$ acting on the ledger blade result in a resultant $Krm$ which tends to move the ledger blade 5 away from the cutter cylinder 1. The ledger blade 5 is maintained in its initial equilibrium position as long as $Krm \cdot f$ (where $f$ is the perpendicular distance of the pivot from the line of action of the force $Krm$) remains smaller than $Kv \cdot d$, i.e. with respect to the pivot 7 the equilibrium equation:

$$Krm \cdot f = Kv \cdot d - Kaa \cdot h$$

holds, which shows that the difference between the moments $Krm \cdot f$ and $Kv \cdot d$ is absorbed by the product of the normal force $Kaa$ acting at the abutment 9 and the distance $h$.

When $Krm \cdot f$ becomes equal to $Kv \cdot d$, which means that $Kaa \cdot h$ is zero, a gap is produced between the abutment 9 and the ledger blade support 6, and the initially cooperating knives and blade start to move apart. The pivot 7 is located at a distance such behind the cutter cylinder 1 that the distance of the axis of the pivot from the line tangent to the cylinder 1 in the point 10 at which the ledger blade 5 is in contact with the cutter cylinder 1 and the distance of this axis from the line which passes through the point 10 and the cylinder spindle 2 are substantially equal.

The direction of the resultant $Krm$ mainly depends upon the relative vertical positions of the cutting edges of the knives and the blade during the cutting operation. In general the cutting edge of the ledger blade will lie beneath the cutting edge of the relevant knife of the cylinder, and these relative positions are shown in the drawings. The smaller is the vertical distance between the said cutting edges during a cutting operation, the more the direction of the resultant $Krm$ will tend to assume the direction of the cutting force $Ks$. It should be noted that the diagram of forces shown in FIG. 1 is based on the assumption that there always will be a cutting gap, however small, between the cooperating knife or knives and blade, so that no forces due to friction need be included.

FIG. 2 shows a cutter-cylinder lawn mower fitted with a self-energizingly arranged ledger blade which in addition is protected. In the embodiment shown in this Figure, the ledger blade is pivotable in a groove 13 between the groove sides about a pivot axis 14, which groove 13 has been formed in that lateral face of the ledger blade support which is nearer the cylinder 1, the pivoting movement towards the cylinder being stopped by an abutment 12.

At the side of the ledger blade 5 more remote from the cylinder 1, the groove 13 has been filled with a resilient material, for example, an extruded rubber channel strip which extends throughout the length of the ledger blade and maintains the cutting edge of the ledger blade in resilient engagement with the cutter cylinder in a contact point 10. The space in the groove 13 between the surface of the ledger blade facing the cylinder and the upper side of the groove is filled with foamed rubber which is partly enveloped by a sheet-steel strip and serves to prevent dirt from lodging in the groove 13. Owing to its self-energizing arrangement the ledger blade 5 tends to pivot towards the cylinder 1 in operation, the line connecting the contact point 10 and the pivot axis 14 lying on that side of the tangent to the cylinder 1 in the point 10 which is more remote from the cylinder 1, while this connecting line from the point 10 in a direction opposite to the travelling direction (see the arrow P) intersects this tangent at an acute angle, which angle must also be regarded as the angle of self-energization (cf. British Patent Specification No. 523,951). The cutting force $Ks$ supplies a normal force $Knz$ which acts on the ledger blade and is equal to the product of the tangent of the self-energization angle and the cutting force $Ks$ to be supplied and serves to prevent the ledger blade 5 from penetrating into the cutter cylinder 1 as it tends to do owing to its selfenergizing arrangement. It should be noted that owing to the engagement between the cutter cylinder 1 and the ledger blade the force $Ks$ to be produced in actual fact must be increased by the force required to overcome the resistance between the cylinder cutter and the ledger blade due to friction. In order to keep the force diagram as simple as possible and also owing to the fact that the introduction of such forces is not necessary for an understanding of the invention, this force is left out of consideration. The normal force $Knz$, which here is uniquely dependent upon the self-energization factor—the product of the tangent of the self-energization angle and the cutting force to be produced—in actual fact is composed of the normal force produced by the material to be cut ($Knm$) and the normal force due to the engagement of the cooperating knife or knives and blade in the point 10. The cutting force and the overall normal force produce a resultant $Krz$ which tends to pivot the ledger blade support 6 away from the cylinder 1. The initial equilibrium position of the ledger blade support 6 at which the cooperating knife and blade engage one another in the point 10, is maintained as long as $$Krz \cdot f1 = Kv \cdot d - Kaa \cdot h,$$

where $f1$ is the perpendicular distance of the pivot 7 from the line of action of the force $Krz$, the difference between the moments $Kv \cdot d$ and $Krz \cdot f1$ being absorbed by the moment produced by the normal force $Kaa$ acting at the abutment 9 multiplied by the distance $h$ between the abutment 9 and the pivot 7. When the moment $Krz \cdot f1$ becomes equal to $Kv \cdot d$, i.e. when $Kaa$ is zero, a gap is produced between the abutment 9 and the ledger blade support 6, but this separation may not cause the ledger blade 5 and the cylinder 1 to move apart, because the ledger blade 5 owing to its self-energizing arrangement will adjust itself until it strikes the abutment 12 situated in the groove 13 near the cylinder 1, whereupon the ledger blade 5 and the ledger blade support 6 will behave as an integral unit. As soon as the contact between the ledger blade 5 and the cutter cylinder 1 is broken, the composition of the normal force acting on the ledger blade is altered in that only the normal force produced by the material to be cut, namely $Knm$, remains.

In this case, the forces $Ks$ and $Knm$ produce a resultant $Krm$. The protection becomes operative when $Krm \cdot f$ exceeds $Kv \cdot d$, where $f$ again is the perpendicular distance of the pivot 7 from the line of action of $Krm$.

In the following description of the embodiments shown in FIG. 3, 5 and 6, in which a self-energizing engagement is also provided, it would appear in view of the preceding explanation to be superfluous to deal exhaustively with the occurrence of normal forces and of resultants produced by the said normal forces and the cutting forces to be supplied. We will content ourselves with just mentioning these forces.

FIG. 3 relates to a preferred embodiment in which a protectedly arranged ledger blade co-operates with a self-energizingly arranged cutter cylinder.

In this preferred embodiment, the subframe 3 bearing the cutter cylinder 2 is pivotably arranged in a slot 11 in the frame 4, the pivotal movement towards the ledger blade being restricted by an abutment 12, the axis of a pivot 15 supported in the frame 4 being situated, in a cross-sectional view taken at right angles to the direction of length of the cylinder spindle 2, when viewed in the travelling direction, in front of the cylinder spidle 2 at a level such that a line passing through the pivot 15 and the contact point 10 intersects a line tangent to the cylinder in the contact point 10 at an acute angle.

This specific disposition of the pivot 15 has been chosen to achieve a self-energizing arrangement of the cutter cylinder 1. The space in the slot 11 has been filled with a resilient material 16 through which the auxiliary frame 3 is guided so that when the mower is not used, the cylinder 1 is resiliently maintained in engagement with the ledger blade 5 in the contact point 10, while the ledger blade 5 and the ledger blade support 6 are designed as shown in FIG. 1. Cutting action produces a force K$rz$ which tends to pivot the ledger blade 5 away from the cutter cylinder 1. The initial equilibrium position of the ledger blade 5 and of the ledger blade support 6 is maintained as long as K$rz$·$f$ remains smaller than K$v$·$d$ and K$aa$·$h$ retains a certain value. When K$rz$·$f$ becomes equal to K$v$·$d$ (so that K$aa$·$h$ becomes zero) a gap is produced between the abutment 9 and the ledger blade support 6, but this does not result in a separation of the cutter from the blade, because the cutter cylinder 1 adjusts itself until the subframe 3 strikes the abutment 12. From this instant, the cylinder 1 will behave in the manner described with reference to FIG. 1. When on further pivotal movement of the ledger blade support 6 the knife and the blade are no longer in engagement, K$rz$ will become K$rm$, while the protection becomes operative when K$rm$·$f$ exceeds K$v$·$d$.

FIG. 4 relates to a protectedly arranged cutter cylinder 1 and a rigidly arranged ledger blade. The auxiliary frame 3 which supports the cylinder spindle 2 is pivotable about a pivot 7 which is journalled in the frame 4 in the manner shown in FIG. 1, while an adjustable abutment secured to the frame 4 limits the pivotal movement of the cutter cylinder 1, which is resiliently supported by the spring 8, towards the ledger blade 5 so as to produce a minimum gap distance. In this situation a force K$rm$ will be produced which tends to pivot to the cylinder away from the ledger blade 5. As long as the moment K$rm$·$f$ remains smaller than K$v$·$d$, the cutter and the blade will remain in their initial positions, but as soon as K$rm$·$f$ exceeds K$v$·$d$ the protection becomes operative and the cylinder 1 is pivoted away from the ledger blade 5. The pivot 7 is disposed in the manner described with reference to FIG. 2.

FIG. 5 relates to a cutter-cylinder lawn mower in which the cylinder is arranged both self-energizingly and protectedly.

In this preferred embodiment the subframe 3, which is pivotable about the pivot 7, extends in the travelling direction beyond the cylinder 1, and in the part extending beyond the cylinder 1 there is journalled a second pivot 16 about which a holder 17 for the cylinder spindle 2 is pivotable in a slot 11 formed in the sub-frame 3, the pivotal movement towards the ledger blade being limited by an abutment 12, while the space in this slot 11 is filled with a resilient material so that when the lawn mower is not used the cylinder 1 is resiliently maintained in engagement with the rigidly mounted ledger blade 5 in the contact point 10.

Cutting action produces, via the cutting knife of the cylinder, a force K$rz$ which acts on the cylinder 1 so as to move it away from the ledger blade 5. When K$rz$·$f$ becomes equal to K$v$·$d$, a gap will be produced between the adjustable abutment 9 and the subframe 3, but this separation does not cause the engagement between the cylinder 1 and the ledger blade 5 to be broken, because owing to its self-energizing arrangement the cylinder 1 will adjust itself until the holder 17 strikes the abutment 12 secured to the subframe 3. From this instant the subframe 3 will react in the manner described with reference to FIG. 4. As soon as the product of the force K$rm$ which then manifests itself and the perpendicular distance of the pivot 7 from the line of action of this force exceeds the moment K$v$·$d$, the subframe 3 pivots away from the ledger blade 5.

Figure 6:
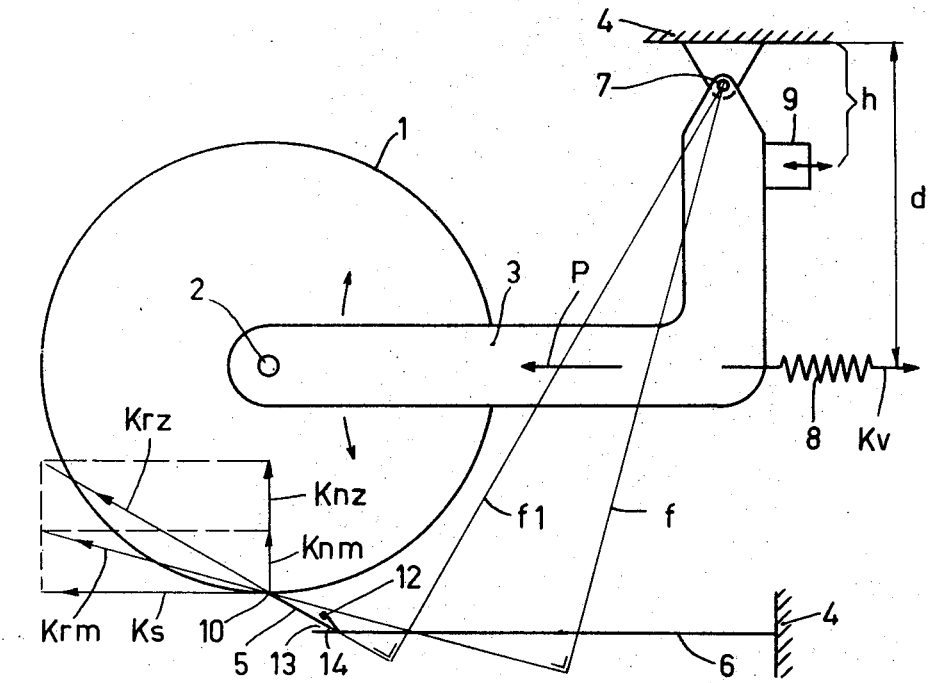

FIG. 6 relates to a preferred embodiment which comprises a protectedly arranged cylinder as described in FIG. 4 and a self-energizingly arranged ledger blade. The ledger blade 5 is mounted in a groove 13 in the manner described with reference to FIG. 2. Cutting action again produces a force K$rz$ which tends to move the cylinder away from the ledger blade 5. As soon as the moment K$rz$·$f'$ becomes equal to K$v$·$d$, a gap will be produced between the abutment 9 and the subframe 3, but again this does not result in the engagement between the cylinder 1 and the ledger blade 5 being broken, because owing to its self-energizing arrangement the ledger blade 5 will adjust itself until it strikes the abutment 12. The resulting force K$rm$ will effect a separation of the knife and the blade when K$rm$·$f$ exceeds K$v$·$d$.

The arrangement of the ledger blade 5 as shown in FIGS. 2 and 6 has the additional advantage that fluctuations of the contact pressure will not cause the lightweight ledger blade to float owing to mass inertia.

What is claimed is:

1. A lawn mower of the cutter-cylinder type comprising a wheeled frame, a subframe attached to said frame, a cutter cylinder rotatably mounted on a spindle carried on said subframe, at least one cylinder knife carried by said cutter cylinder, a ledger blade support pivotally attached to said frame, a ledger blade carried by said ledger blade support and arranged for cooperative engagement with said cylinder knives, helical spring means secured at one end thereof to said frame and connected at its other end to said ledger blade support for urging said ledger blade and said cylinder together so that the blade and knives are resiliently held towards each other, an adjustable abutment secured to the frame for limiting the travel of said ledger blade support so as to produce a cutting gap between the ledger blade and the cutter cylinder, a pivot journalled in the frame and extending parallel to said cutter cylinder spindle, said knife and blade which are resiliently held towards each other being pivotable about said pivot into engagement with said abutment, whereby the cutting force which is produced during a cutting operation results in a cutting moment acting about said pivot with respect to each said knife, said cutting moment acting opposite to the spring moment caused by said spring acting about said pivot with respect to each said knife, so that upon an excessive cutting force during a cutting operation said cutting moment will exceed the spring moment and cause the cylinder knife and ledger blade to separate, said ledger blade support being arranged so as to be pivotable about said pivot journalled in the frame, the axis of said pivot being located behind the cylinder spindle with respect to the direction of travel of the mower and being located an equal distance from the line tangent to said cylinder at the point of contact between said cylinder and said ledger blade and the line passing through said contact point and the center of said cylinder spindle.

2. The lawn mower according to claim 1 further comprising a groove formed in the lateral surface of said ledger blade support nearest said cylinder, said ledger blade being pivotally arranged within said groove, an abutment arranged for limiting the movement of said ledger blade towards the cutter cylinder, the line passing through said contact point and the axis of pivot for said blade being located at the side of a line tangent to said cylinder at the contact point more remote from the cylinder and intersecting said tangent line at an acute angle when running in a direction opposite to the direction of travel of the mower.

3. The lawn mower according to claim 2 wherein said groove is filled with a strip of extruded rubber extending throughout the length of said ledger blade for maintaining the cutting edge of said ledger blade in resilient engagement with the cutter cylinder at said contact point, and said groove being closed on the side of the ledger blade nearer said cylinder.

4. The lawn mower according to claim 1 further comprising a slot formed in said frame, said subframe being accommodated within said slot for pivotal movement toward and away from said ledger blade, the movement thereof toward said ledger blade being limited by an abutment within said slot, said subframe being pivotally connected to said frame at a pivot point, the axis of said pivot point being located in front of said spindle when viewed in the direction of travel of said mower, and wherein the line passing through said pivot point and said contact point intersects the line tangent to said cylinder at said contact point at an acute angle, said slot being filled with a resilient material so that said cylinder is maintained in engagement with said ledger blade when the mower is not in use.

5. A lawn mower of the cutter-cylinder type comprising a wheeled frame, a subframe mounted on said frame a cutter cylinder journalled in said subframe, at least one cylinder knife carried by said cutter cylinder, a ledger blade support pivotally attached to said frame, a ledger blade carried by said ledger blade support and arranged for cooperative engagement with said cylinder knives, helical spring means secured at one end thereof to said frame and connected at its other end to said ledger blade support for urging said ledger blade and said cylinder together so that the blade and knives are resiliently held towards each other, an adjustable abutment secured to the frame for limiting the travel of said ledger blade support so as to produce a cutting gap between the ledger blade and the cutter cylinder, a pivot journalled in the frame and extending parallel to said cutter cylinder spindle, said knife and blade which are resiliently held toward each other being pivotable about said pivot into engagement with said abutment, whereby the cutting force which is produced during a cutting operation results in a cutting moment acting about said pivot with respect to each said knife, said cutting moment acting opposite to the spring moment caused by said spring acting about said pivot with respect to each said knife, so that upon an excessive cutting force during a cutting operation said cutting moment will exceed the sping moment and cause the cylinder knife and ledger blade to separate, said subframe being arranged for pivotal movement about said pivot, and said adjustable abutment being arranged for limiting the movement of said subframe, the axis of said pivot being located behind said spindle with respect to the direction of travel of the mower and being located at a point an equal distance from the line tangent to said cylinder at the point of contact between said cylinder and said ledger blade and the line passing through said contact point and the center of said cylinder spindle.

6. The lawn mower according to claim 5 wherein said subframe extends in the travelling direction beyond the cutter cylinder, and further comprising a second pivot journalled in the frame and located in front of said cylinder with respect to the forward direction of travel of said mower, a slot in said subframe, a holder for the cylinder spindle mounted for pivotal movement in said slot about said second pivot, an abutment within the slot for limiting the pivotal movement toward said ledger blade, and a resilient material filling said slot so that when the lawn mower is not in use said cutter cylinder will be resiliently maintained in engagement with the ledger blade.

7. The lawn mower according to claim 5 further comprising a groove formed in the lateral face of the ledger blade support nearest the cutter cylinder, said ledger blade being pivotally arranged within said groove, an abutment arranged for limiting the movement of said ledger blade towards the cutter cylinder the line passing through said contact point and the axis of pivot for said blade being located at the side of a line tangent to said cylinder at the contact point more remote from the cylinder and intersecting said tangent line at an acute angle when running in a direction opposite to the direction of travel of the mower.

8. The lawn mower according to claim 7 wherein said groove is filled with a resilient material in which said ledger blade is embedded.

9. The lawn mower according to claim 5 wherein said subframe is substantially hook-shaped with one leg thereof being oriented substantially horizontally and the other leg thereof being connected to said pivot.

* * * * *